United States Patent [19]
Padgett et al.

[11] Patent Number: 5,446,869
[45] Date of Patent: Aug. 29, 1995

[54] CONFIGURATION AND RAM/ROM CONTROL OF PCI EXTENSION CARD RESIDING ON MCA ADAPTER CARD

[75] Inventors: Russell S. Padgett, West Palm Beach; Amado Nassiff, Hialeah; Spencer G. Rauenzahn, II, Delray Beach, all of Fla.

[73] Assignee: International Business Machines Corporation, Armonk, N.Y.

[21] Appl. No.: 175,988

[22] Filed: Dec. 30, 1993

[51] Int. Cl.⁶ ............................................. G06F 13/00
[52] U.S. Cl. ........................ 395/500; 364/DIG. 1; 364/DIG. 2; 364/231; 364/232.7; 364/927.81; 364/927.92; 364/929.2; 364/929.4; 364/929.5; 364/929.6
[58] Field of Search ............... 395/325, 200, 250, 500, 395/700, 800, 400, 425; 364/DIG. 1 MS File

[56] References Cited
U.S. PATENT DOCUMENTS

| | | | |
|---|---|---|---|
| Re. 31,318 | 7/1983 | Kaufman et al. | 395/325 |
| 4,281,392 | 7/1981 | Grants et al. | 395/325 |
| 4,779,187 | 10/1988 | Letwin | 395/725 |
| 4,783,730 | 11/1988 | Fischer | 395/325 |
| 4,799,186 | 1/1989 | Ployette | 395/425 |
| 4,827,408 | 5/1989 | Shimomura | 395/275 |
| 4,937,785 | 6/1990 | Deering | 395/325 |
| 4,984,213 | 1/1991 | Abdoo et al. | 395/400 |
| 4,991,085 | 2/1991 | Pleva et al. | 395/325 |
| 5,036,460 | 7/1991 | Takahira et al. | 395/425 |
| 5,038,320 | 8/1991 | Heath et al. | 395/275 |
| 5,043,877 | 8/1991 | Berger et al. | 395/325 |
| 5,083,259 | 1/1992 | Maresh et al. | 395/325 |
| 5,128,995 | 7/1992 | Arnold et al. | 380/4 |
| 5,138,706 | 8/1992 | Melo et al. | 395/500 |
| 5,191,653 | 3/1993 | Banks et al. | 395/275 |
| 5,191,657 | 3/1993 | Ludwig et al. | 395/325 |
| 5,206,938 | 4/1993 | Fujioka | 395/400 |
| 5,214,695 | 5/1993 | Arnold et al. | 380/4 |
| 5,226,145 | 7/1993 | Moronaga et al. | 395/425 |
| 5,237,690 | 8/1993 | Bealkowski et al. | 395/700 |
| 5,245,322 | 9/1993 | Dinwiddie, Jr. et al. | 395/154 |
| 5,255,374 | 10/1993 | Aldereguia et al. | 395/325 |
| 5,301,281 | 4/1994 | Kennedy | 395/325 |

Primary Examiner—Robert B. Harrell
Attorney, Agent, or Firm—Martin J. McKinley; David L. McCombs

[57] ABSTRACT

Method and apparatus for enabling configuration of a PCI daughter card residing on an MCA adapter card using MCA setup cycles and signals and for ensuring the allocation of memory space to the daughter card. In a preferred embodiment, the invention comprises an MCA adapter card connected to an MCA system bus of a conventional PC. A PCI-compliant daughter card, the purpose of which is to provide additional functionality to circuitry of the adapter card, resides on a PCI bus of the adapter card. A PCI/MCA bridge is provided for interfacing the MCA system bus with the PCI bus of the adapter card for enabling configuration of the daughter card during the setup sequence of the MCA bus and to respond with an appropriate ROM signature during DOS boot-up to ensure that memory space will be allocated to the daughter card, if needed. A first set of XPOS registers of the adapter card are used selectively to enable the bridge and to allow the PCI configuration space, or registers, of the daughter card and other PCI-compliant devices on the daughter card to be selectively accessed and initialized. Certain registers of a second set of XPOS registers are used to set the data flow mode of the bridge and to respond with the correct ROM signature at DOS boot-up of the PC. The remaining ones of the second set of XPOS registers are used selectively to enable and to store the size and location of any necessary RAM and/or ROM apertures of the daughter card, thereby enabling the bridge to initiate a PCI operation to the daughter card if it decodes an address within either of the apertures.

44 Claims, 3 Drawing Sheets

CONFIGURATION AND RAM/ROM CONTROL OF PCI EXTENSION CARD RESIDING ON MCA ADAPTER CARD

TECHNICAL FIELD

The invention relates generally to adapter cards for personal computers (PCs) and, more specifically, to method and apparatus for enabling configuration and initialization of a Peripheral Component Interconnect (PCI) extension card residing on a Micro Channel Architecture (MCA) adapter card and for ensuring that memory space is allocated to the PCI extension card during boot-up of the PC.

BACKGROUND OF THE INVENTION

Personal computers (PCs) have undergone evolutionary changes since the original models based on the Intel 8088 microprocessor, such as the International Business Machine Corporation (IBM) PC and other IBM-compatible machines. As the popularity of PCs have grown, so has the demand for more advanced features and increased capability and speed, to the development of such higher order microprocessors as the Intel 20286, 30386, 40486, and more recently, the Pentium.

In response to the above demands, in addition to a desire to make PCs more "user-friendly," IBM introduced the Personal System/2 (PS/2) family of personal computers, which are based on a different type of architecture, referred to as the Micro Channel Architecture, or MCA, than IBM's "Family I" systems, which utilize the Industry Standard Architecture, or ISA. One major change introduced by IBM in the shift from the ISA to the MCA was the specification of Programmable Option Select, or POS, registers, which eliminate the need to configure an expansion board by setting jumpers and DIP switches by handling all configuration through software. Configuration data is stored in POS register space of each expansion board in CMOS memory and in an Adapter Description File, or ADFs, associated with the expansion board and stored on the boot disk. The operating system of the PCI automatically loads the stored configuration data into each expansion board each time the PC is booted, and also ensures the integrity of the configuration data.

The PC is configured using setup cycles to transfer adapter ID and adapter configuration data between the system master, or CPU, and the adapters. The system configuration procedure is similar to any basic data transfer except that an adapter is selected by an active CDSETUP signal, a valid POS register address is driven on the address bus; however, only bits A(2-0) are decoded by the adapter, and all configuration data transfers are one byte (i.e., eight-bit) transfers which occur on bits D(0-7) of the data bus.

During system setup, only one expansion slot is selected at a time by asserting that slot's CDSETUP line, which is driven by system logic to individually select one of the eight expansion slots of the PC into which adapter cards may be inserted. Each expansion slot has a dedicated CDSETUP line, providing an independent CDSETUP signal for each slot. When a particular slot's CDSETUP line is activated, if an adapter card is present, access is gained to the adapter's POS registers, in which are stored the ID number and configuration data of the adapter.

POS operations are keyed to adapter ID numbers, which are unique designations assigned to each model of adapter for the MCA and every MCA adapter card must be assigned such a number. Once an adapter card has been selected, it is queried for its adapter ID number, which is compared with a value stored in CMOS memory assigned to the expansion slot. If the two numbers match, the boot disk is searched for an ADF of the adapter, which contains configuration data for configuring the adapter. If the ID number read from the adapter card does not match the ID number stored in CMOS or if the adapter's ADF is not found, an error results and a system configuration utility must be run again. Otherwise, configuration data is read from the ADF and used to initialize the adapter's POS registers.

MCA provides eight POS registers numbered 0-7. Data transfers to and from the POS registers is accomplished in a manner similar to any basic data transfer function, except that, when a valid POS register address is driven on the address bus only lines A(2-0) of the address bus are decoded by the adapter to determine which of the eight POS registers is being addressed. The following Table I shows the organization of the address space used for POS operations:

TABLE 1

| ADDRESS | FUNCTION |
| --- | --- |
| XXX0h | POS Register 0 - Adapter ID Byte (low byte) |
| XXX1h | POS Register 1 - Adapter ID Byte (high byte) |
| XXX2h | POS Register 2 - Option Select Data Byte 1 (Bit 0 is designated as Card Enable) |
| XXX3h | POS Register 3 - Option Select Data Byte 2 |
| XXX4h | POS Register 4 - Option Select Data Byte 3 |
| XXX5h | POS Register 5 - Option Select Data Byte 4 (Bit 7 is designated as channel check) (Bit 6 is designated as channel-check-status indicator) |
| XXX6h | POS Register 6 - Subaddress Extension (low byte) |
| XXX7h | Register 7 - Subaddress Extension (high byte) |

In addition to the eight POS registers, MCA provides a mechanism for accessing up to 128 KB of additional POS register space, referred to as extended POS (XPOS). XPOS registers are accessed during the setup sequence by writing a two byte value to POS registers 7 (high byte) and 6 (low byte), which value is then used as an index to an XPOS register for all setup-cycle accesses to POS registers 3 and 4. For example, if 0001h is written to POS registers 7 and 6, access to XPOS register 0001h may be had through POS register 4. Additional information on IBM's MCA can be obtained by referring to a publication entitled "Personal System/2 Model 80 Technical Reference," published April, 1987 by IBM Corp., Armonk, N.Y.

More recently, an alternative to the MCA, referred to as the "Peripheral Component Interconnect," or PCI, bus has been developed as a physical interconnect mechanism intended for use between highly integrated peripheral controller components and processor/memory systems. Like MCA adapters, PCI compliant devices must be initialized and configured and, similar to the MCA, PCI provides for totally software driven initialization and configuration via a separate configuration address space. Unlike MCA, however, PCI comprises 256 bytes of configuration space, or 256 configuration registers, as opposed to 8 bytes of POS space and 128 KB of XPOS space. Additionally, PCI devices are selected during configuration through use of an IDSEL signal, similar to the CDSETUP signal of the MCA, which is provided each device on the PCI bus, with selection of a particular device being performed by driving one of the 24 most significant AD(31-0) lines high while the IDSEL line is active.

The selected PCI device responds to the CPU with a DEVSEL# signal. Addressing of the 256-byte register space of the selected device may then be performed using the AD(7-2) lines. Additional details concerning the protocol, electrical and mechanical feature of the PCI bus are set forth in the publication entitled "PCI Specification Revision 2.0—Review Draft Mar. 9, 1993" published by the PCI Special Interest Group, Hillsboro, Oreg.

It may be desirable in certain instances to provide a basic adapter card with additional functionality not originally included on the adapter card itself due to various reasons such as cost or size constraints on the card. Typically, such additional functionality will be a matter of a user's personal choice. For example, a basic display adapter typically will not include the necessarily circuitry and logic for implementing Joint Photographic Experts Group (JPEG) or Motion Picture Experts Group (MPEG) image compression algorithms, as many users would have no need for such functionality and would not be willing to pay for it to be included on their display adapters. Other users, while they do not initially see the need for such additional functionality, may later see a need for it, but will not want to be forced to buy a new display adapter to obtain it. Alternatively, a user may need to be able to use the algorithms interchangeably.

A solution to the above situation is to include the additional functionality, such as circuitry and logic for performing MPEG and JPEG, on an extension card, herein referred to as a "daughter card," which is removably connectable to the adapter card itself. In this manner, a user may purchase a basic adapter card and then select the additional functions he or she would like to have the capability to perform.

A problem which arises in connection with the above-described use of the daughter card lies in the fact that, because it appears that the PCI bus is fast becoming the new industry standard, it may be desirable to design daughter cards and the components residing thereon to be PCI-compliant, so that they may be moved to the planar, or motherboard, of a PC having a PCI local bus without requiring additional modification to the circuitry thereof. However, most existing PCs, and thus, most available adapter cards, are MCA- or ISA-, rather than PCI-, compliant. Therefore, a problem exists as to how to initialize and configure a PCI daughter card residing on an MCA adapter card using MCA signals, setup cycles and protocols to do so.

Another problem which arises in connection with the use of daughter cards is that of enabling RAM and/or ROM of a daughter card to be accessed, or addressed, by the other devices of the PC. During configuration of the PC, a memory manager of the host polls each adapter card inserted in an expansion slot to determine the amount of memory space required thereby. The memory manager will then allocate to each card the requested amount of space in blocks of 8 KB, not to exceed a total of 16 KB of memory space per card. However, because the host, and thus the memory manager, will not be aware of the existence of any daughter cards residing on one or more of the adapter cards, memory space will not be allocated thereto. As a result, any RAM and/or ROM residing on a daughter card is rendered inaccessible.

Therefore, what is needed is a technique for configuring a PCI daughter card using MCA configuration cycles and signals and a technique for ensuring that memory space is allocated to a daughter card residing on an adapter card during system boot-up.

SUMMARY OF THE INVENTION

The foregoing problems are solved and a technical advance is achieved by method and apparatus for enabling the configuration of a PCI daughter card residing on an MCA adapter card using MCA setup cycles and signals and for ensuring the allocation of memory space to the daughter card. In a departure from the art, an adapter card designed to reside on an MCA bus is provided with a bridge for interfacing an MCA system bus of a PC with a PCI bus on the adapter card, upon which the daughter card resides, and for converting MCA setup cycles and signals to appropriate PCI configuration signals to properly configure the PCI configuration data space of the daughter card. In a further departure from the art, the bridge responds with an appropriate ROM signature when the adapter card slot is polled at DOS boot-up so that a memory manager of the PC will allocate memory space to the daughter card.

In a preferred embodiment, the invention comprises an MCA-compliant adapter card connected to an MCA system bus of a conventional PC, for example, an IBM Model PS/2, or similar device. A PCI-compliant daughter card, the function of which is to provide additional functionality to circuitry of the adapter card, resides on a PCI bus of the adapter card. A PCI/MCA bridge is provided on the adapter card for interfacing the MCA bus of he PC with the PCI bus of the adapter card to enable configuration of the daughter card during the setup sequence of the MCA bus and to respond with an appropriate ROM signature during DOS boot-up of the PC to ensure that memory space is allocated to the daughter card, if needed.

In one aspect of the invention, a first set of XPOS registers of the adapter card are used selectively to enable the operation of the bridge and to allow the PCI configuration space, or registers, of the daughter card and other PCI-compliant devices on the daughter card to be selectively accessed and initialized.

In another aspect of the invention, certain registers of a second set of XPOS registers are used to set the data flow mode of the bridge to a RAM or ROM mode, in which the bridge responds when the adapter card is polled during DOS boot-up with the appropriate ROM signature of the daughter card, or a passthru mode, in which data is passed through the bridge to and from the PCI bus, and also to initialize the ROM signature of the daughter card to an appropriate value. The remaining ones of the second set of XPOS registers are used selectively to enable and to store the size and location of any necessary RAM and/or ROM apertures of the daughter card, thereby enabling the bridge to initiate a PCI operation to the daughter card if it decodes an address within either of the apertures.

A technical advantage achieved with the invention is that it enables a PCI-compliant device, such as a daughter card, to be configured using MCA setup cycles and signals.

A further technical advantage achieved with the invention is that it provides the adapter card with a built in PCI/MCA interface, embodied in the bridge, such that circuitry of the adapter card may be moved to reside directly on a PCI local bus on the planar of a PC without substantial modification thereof.

A further technical advantage achieved with the invention is that it ensures that memory space will be allocated to the daughter card, such that any RAM and/or ROM thereof may be accessed.

DESCRIPTION OF THE ILLUSTRATIVE EMBODIMENTS

Figure 1:
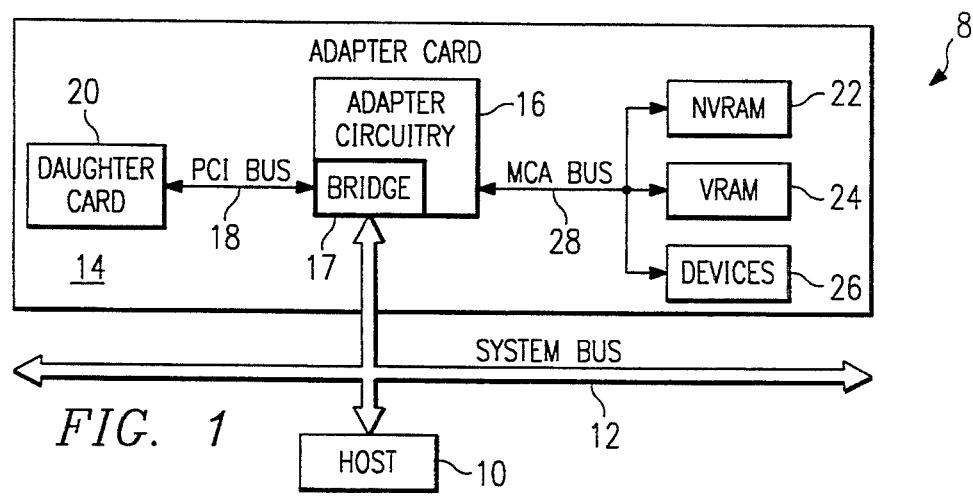
FIG. 1 is a schematic block diagram of an adapter card embodying features of the present invention.

Referring to FIG. 1, the reference numeral 8 designates a personal computer (PC) system, which is preferably an IBM or IBM-compatible PC, comprising a host portion 10 connected to a system bus 12. In the preferred embodiment, the system bus 12 comprises an IBM Micro Channel Architecture (MCA) standard bus; however, the system bus 12 may comprise any number of other types of buses, such as an Industry Standard Architecture (ISA), or AT, bus, for example. Although not shown, it should be understood that the host 10 comprises at least a central processing unit (CPU), memory, memory management circuitry, I/O devices and other components and logic necessary for a complete and operative PC system 8.

An adapter card 14, the functionality of which resides in adapter circuitry 16, connects to the system bus 12 via one of eight expansion slots (not shown) of the PC 8. In addition to all the necessary hardware and logic for performing a designated function of the adapter card 14, the adapter circuitry 16 comprises a bridge 17, which is connected to the system bus 12. Adapter circuitry 16 is preferably embodied as an integrated circuit (IC) chip, although it may also comprise any number of individual hardware and logic components.

As will be described in detail, in the preferred embodiment, it is a function of the bridge 17 to provide an interface between an MCA bus, such as the system bus 12, and a peripheral component interface (PCI) bus 18 to which a PCI extension, or daughter, card 20 is connected. Although not described in detail herein, it is related function of the bridge 17 to provide an interface between adapter circuitry 16 and a PCI local bus on the planar of a PC such that the adapter circuitry 16 may reside directly on a local PCI bus on the planar of a PCI without requiring modifications to be made to the circuitry 16. Finally, it may be a function of the bridge 17 to provide an interface between the system bus 12 and several MCA devices included on the card 14, such as an NVRAM 22, a VRAM 24 and other devices 26, via an MCA bus 28.

The daughter card 20 comprises circuitry and logic for enhancing the functionality of the adapter card 14. For example, if the adapter card 14 is a display adapter and adapter circuitry 16 comprises the necessary components of a display subsystem, in some instances, a user might want the ability selectively to increase the functionality of the card 14 by adding circuitry for implementing such algorithms as the Joint Photographic Experts Group (JPEG) or Motion Picture Experts Group (MPEG) image compression algorithms. Due to structural, cost and other limitations inherent in the card 14, it may be difficult or otherwise undesirable to incorporate such additional functionality directly into the card 14. Additionally, the user may desire the flexibility to use the MPEG algorithm in some instances and the JPEG algorithm in others. Accordingly, circuitry and logic for performing a particular image compression algorithm may be embodied in an extension card, such as the daughter card 20, which may be removably connected to the adapter card 14.

In a preferred embodiment, the daughter card 20 is PCI compliant, i.e., it is designed to reside on a PCI, rather than an MCA, bus, while the adapter card 14 is an MCA compliant device designed to reside on an MCA bus, such as the system bus 12. Therefore, a problem exists with respect to the fact that the daughter card 20 must be initially configured and subsequently driven using MCA signals and setup cycles.

A related problem exists in ensuring that a memory manager (not shown) embodied within the host 10, allocates memory space to the daughter card 20 such that any RAM and/or ROM thereon may be accessed. Because the host 10 views the adapter card 14 as a single card, rather than as two separate cards comprising the adapter card 14 and the daughter card 20, unless the daughter card 20 has some way to make its presence known to the memory manager, memory space will only be allocated to the adapter card 12. It is these two problems that the present invention is designed to address.

Figure 2:
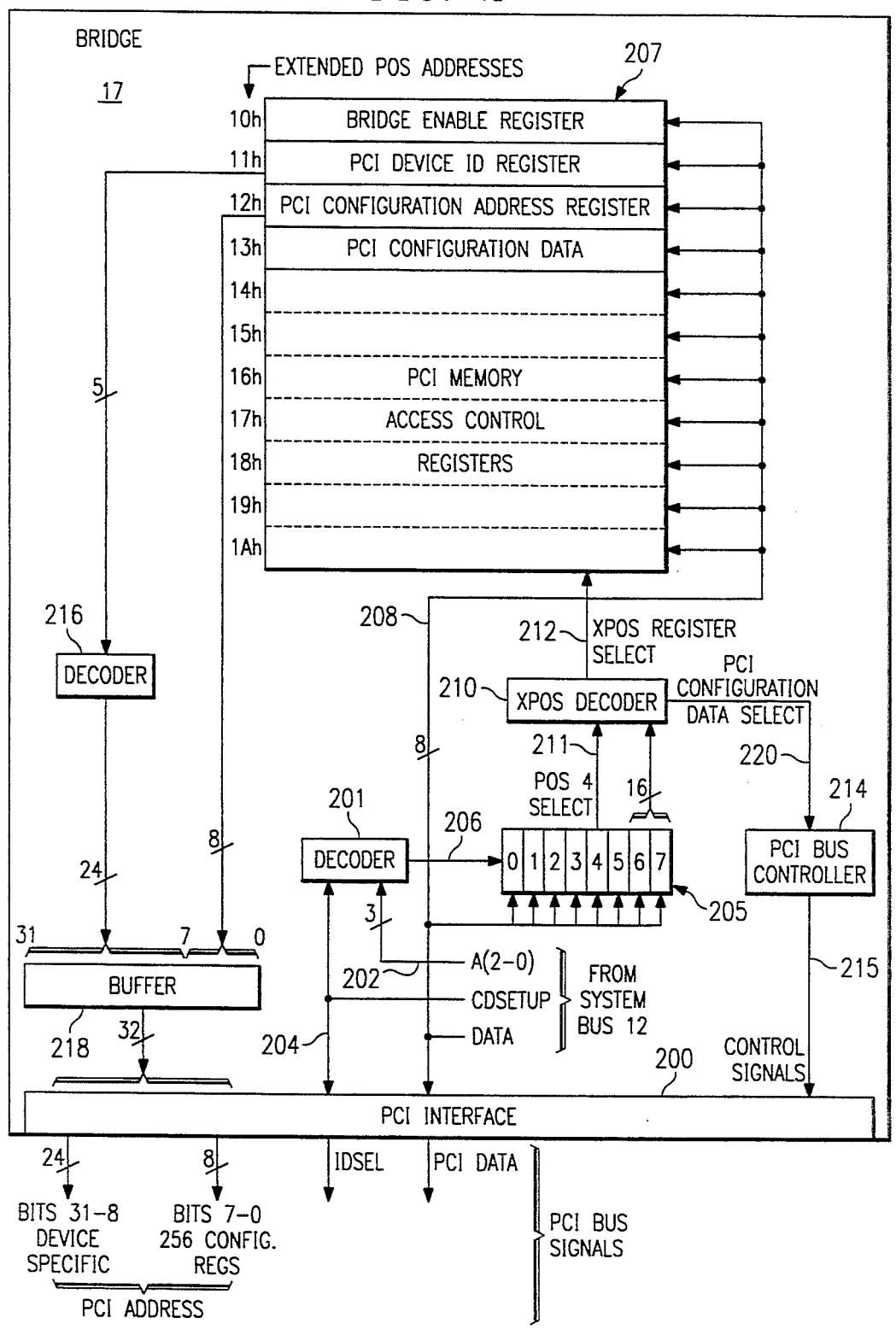
FIG. 2 is a detailed schematic block diagram of a bridge of the adapter card of FIG. 1.

FIG. 2 is a detailed block diagram of the bridge 17 of FIG. 1. Bridge 17 comprises a PCI interface 200 for interfacing MCA signals from the system bus 12 with the PCI bus 18, as will be described in detail. The bridge 17 further comprises a POS address decoder 201 connected to receive a three bit address on the three least significant address lines (A(2-0)) of the system bus 12, which are collectively represented by a line 202, and a CDSETUP signal on a CDSETUP line 204 of the system bus 12. As is known in the art, the CDSETUP signal on the line 204 is driven by system logic within the host 10 to select the expansion slot (not shown) into which the adapter card 14 has been inserted. When the CDSETUP signal line 204 is active, the adapter card 14 is selected and access is gained to its eight 8-bit programmable option select (POS) registers 0–7, collectively designated by a reference numeral 205.

As is well known in the art, during a card setup, or configuration, sequence, one of the POS registers 205 is selected to be written to or read from by driving the three bit address of the selected POS register on the A(2-0) lines. The address is decoded by the decoder 201, which provides a signal to the POS registers 205, via a line 206, to select the POS register addressed by lines A(2-0). Configuration data read from an adapter description file (ADF) of the adapter card 14 stored in the host 10 may then be written to the selected POS register via data lines D(7-0) of the system bus 12, which data lines are collectively represented by a line 206.

As will be described, POS registers 4, 6 and 7 may be used to access extended POS, or XPOS, register space 207. In accordance with a feature of the present invention, XPOS registers 10h-13h are collectively designated for use as "PCI Device Configuration registers," the configuration and function of which will be described in detail below. Additionally, XPOS registers 14h-1Ah are collectively designated for use as "PCI Memory Access Control registers," the configuration and function of which will be described in detail with reference to FIG. 4.

It is well known that, a register in the XPOS register space 207 may be accessed by writing the most significant byte (MSB) and the least significant byte (LSB) of a sixteen-bit value to POS registers 7 and 6, respectively, which value is used as an index to an XPOS register in the XPOS register space 207, and then selecting POS register 4 by driving 100b on the lines A(2–0). Responsive to the selection of POS register 4, a POS 4 SELECT signal is provided to an XPOS decoder 210 on a line 211, causing the decoder 210 to decode the sixteen bit value stored in POS registers 7, 6 and to select the XPOS register indexed thereby by activating the appropriate one of select lines 212. Accordingly, accesses to one of the XPOS registers 10h-1Ah are made by indexing the appropriate one of the registers using POS registers 7, 6 and then accessing POS register 4, at which point that configuration data may be read from or written to the indexed XPOS registers via the line 208. In this manner, POS register 4 functions as a "window" to an XPOS register addressed by POS registers 7, 6.

For purposes which will be subsequently described in detail, the bridge 17 further comprises a PCI bus controller 214 connected to the PCI interface 200 for providing control signals thereto via a line 215, a decoder 216 connected to receive the value stored in XPOS register 11h, and a buffer 218, the upper three bytes of which are connected to receive an output of the decoder 216 and the LSB of which is connected to receive the value stored in XPOS register 12h.

The configuration and function of the PCI Device Configuration registers, i.e., XPOS registers 10h-13h, will now be described in detail. XPOS register 10h is designated as a Bridge Enable register, which is used for controlling the function of the bridge 17 depending on whether a daughter card, such as the daughter card 20, is being used and whether the adapter circuitry 16 is placed on the adapter card 14 or on a local PCI bus on the planar of a PC (not shown). Bit 0 of the Bridge Enable register (the "Enable bit") is used to enable (bit 0=0) or disable (bit 0=1) operation of the bridge 17, depending on whether a daughter card, such as the daughter card 20, is being used. The condition of bit 0 will also depend on whether the adapter circuitry 16 is connected directly to a planar having a PCI bus, in which case the bridge 17 will be enabled to provide the adapter circuitry 16 with a PCI interface for interfacing with a local PCI bus of the planar of a PC (not shown).

Bit 1 of the Bridge Enable register (the "Placement bit") is read only and identifies whether the adapter circuitry 16 resides on a local PCI bus on the planar of a PC (not shown) (bit 1=0) or on the adapter card 14 (bit 1=1). Bit 1 also controls the validity of all other bits in the Bridge Enable register, such that when the Placement bit is 0, the remaining bits of the Bridge Enable register are "don't cares," because the daughter card 20 is connected to a local PCI bus (not shown) on the planar of a PC. Otherwise, the remaining bits must be set to control the functions of the bridge 17 with respect to the daughter card 20. The condition of the Placement bit (i.e., 0 or 1) is determined by a bit in a configuration register in the host 10, which indicates whether the daughter card 20 resides on the adapter card 14 or on the planar.

Bit 2 of the Bridge Enable register (the "Decode bit"), identifies whether subtractive (bit 2=0) or subtractive/positive (bit 2=1) address decoding will be supported by the PCI interface 200. Positive decoding is faster, as each PCI device on the PCI bus 18, such as the daughter card 20, will be looking for addresses in the address range(s) assigned to it. Subtractive decoding can be implemented only by one device on the bus 18, in this case, the daughter card 20, because it accepts all accesses not positively decoded by some other agent. Subtractive decoding is slower because a device must give all other bus agents a "right of first refusal" with respect to each access.

When the Decode bit is set to 1, the daughter card supports subtractive decoding, which will allow all other devices (not shown) on the PCI bus 18 to respond with a DEVSEL# signal before responding. If no other device asserts the DEVSEL# line within three PCI clocks, the bridge 17 will drive the line active on the fourth clock, based on the assumption that a PCI bus master (not shown) is attempting to transfer data to or from the system bus 12. If the adapter circuitry 16 is selected, a positive decoding will be used, in which case the adapter circuitry 16 will assert DEVSEL# within three PCI clocks after it decodes an address which falls within the address range(s) assigned to it. If the Decode bit is set to 0 or if the Placement bit is set to 1, only positive decodes will be supported. Of the remaining Bridge Enable register bits 3–7, bits 3–6 are reserved for use other than in connection with the present invention and bit 7 is unused.

XPOS register 11h is designated as a PCI Device ID register, which is used to identify which PCI device (not shown) on the daughter card 20 is being selected during a configuration cycle. Because the CDSETUP signal of the MCA bus can only be passed as an IDSEL signal to a single device on the PCI interface 200, the contents of the Device ID register are used to index the selected device. A five bit value stored in bits 4–0 of the PCI Device ID register, when decoded by the decoder 216, will cause one of the PCI bus AD(31–8) lines, each of which are connected to a single PCI device on the daughter card 20, to be driven high. This active high line is used in connection with the CDSETUP/IDSEL signal to select the one of the PCI devices to be configured. For example, if bits 4–0 of the PCI Device ID register are 01100b, the AD(20) line would be driven high and the device attached thereto would be selected.

XPOS register 12h is designated as a PCI Configuration Address register, which is used in conjunction with the PCI Device ID register to access a byte of PCI configuration data of the selected PCI device (as indicated by the contents of the Device ID register) during a configuration cycle. Bits 7–0 of the PCI Configuration Address Register are used as an index to one of the 256 bytes of configuration data of the selected device to be accessed during a configuration cycle. A map of the PCI configuration data space is shown below in Table II:

TABLE II

| BYTE(S) | DESCRIPTION | ACCESS TYPE |
| --- | --- | --- |
| 0-1 | Vendor Identification | Read Only |
| 2-3 | Device Identification | Read Only |
| 4-5 | Command | Read/Write |
| 6-7 | Status | Read/Write |
| 8 | Revision ID | Read Only |
| 9-Bh | Class Code | Read Only |
| Ch | Cache Line Size | Read/Write |
| Dh | Latency Timer | Read/Write |
| Eh | Header Type | Read Only |
| Fh | Built In Self Test | Read/Write |
| 10h-27h | Base Address Registers | Read/Write |
| 28h-2Fh | Reserved | — |
| 30h-33h | Expansion ROM Base Address | Read/Write |
| 34h-37h | Reserved | — |
| 38h-3Bh | Reserved | — |
| 3Ch | Interrupt Line | Read Only |
| 3Dh | Interrupt Pin | Read Only |
| 3Eh | Min_GNT | Read Only |
| 3Fh | Max_LAT | Read Only |
| 40h-FFh | Device Specific | — |

XPOS register 13h is designated "PCI Configuration Data." When the XPOS decoder 210 decodes an access to XPOS register 13h, a PCI Configuration Data Select signal is transmitted to the PCI bus controller 214 via a line 220. Responsive to receipt of the signal on th line 220, the controller 214 transmits control signals to the PCI interface 200 to cause the interface 200 to throughput the data from the system bus 12 onto the PCI bus 18. In this manner, data may be written to the selected PCI configuration byte address (as specified in the PCI Configuration Address register) of the selected PCI device (as specified in the PCI Device ID register) via XPOS register 13h.

Figure 3:
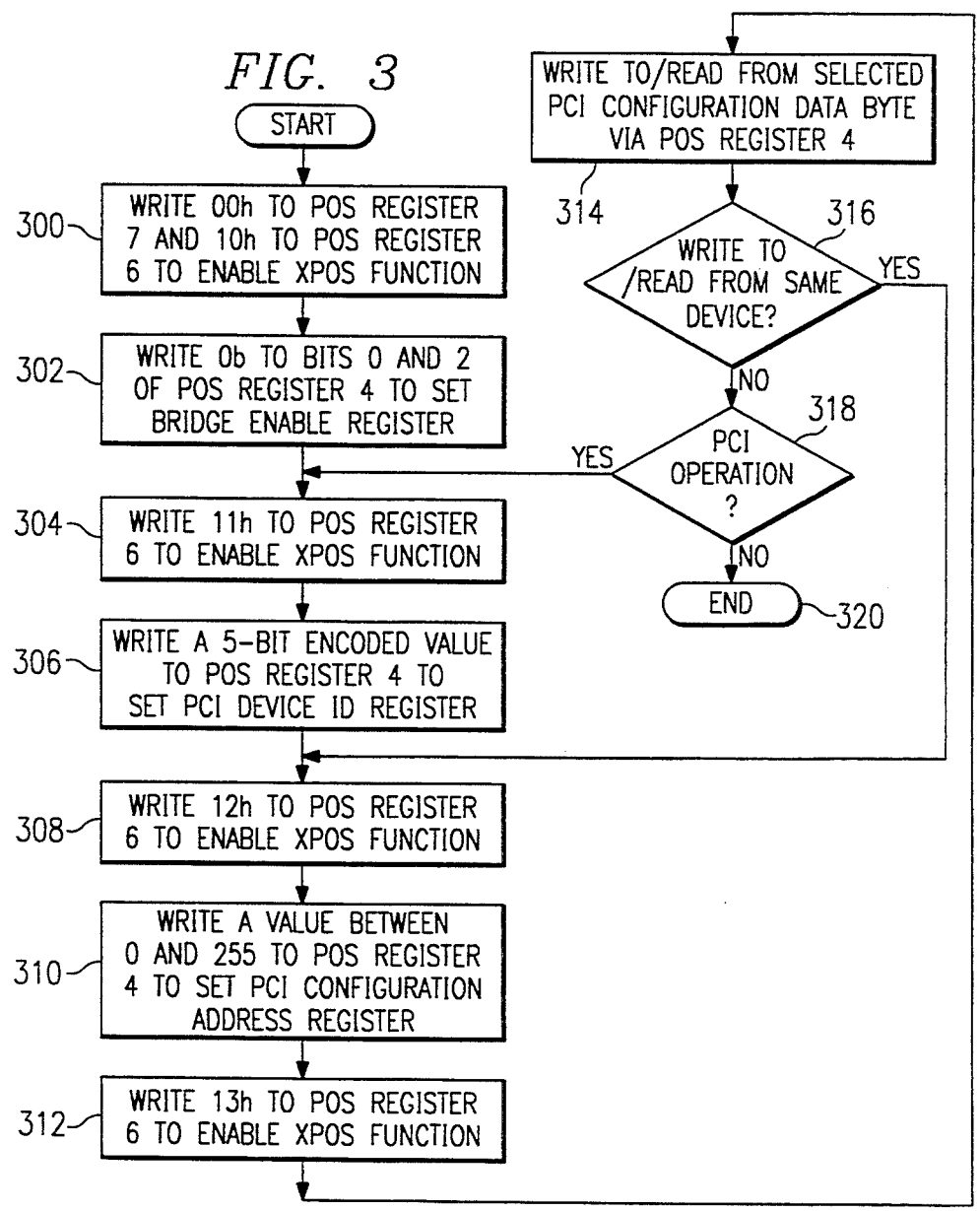
FIG. 3 is a flowchart of a method of the present invention for using MCA signals and setup cycles to configure a PCI daughter card residing on the adapter card of FIG. 1.

FIG. 3 is a flowchart of a method of the present invention for configuring the PCI daughter card 20. In step 300, 00h is written to POS register 7 and 10h is written to POS register 6, it being understood that writing to and reading from POS registers is well known in the art and will not be further described. In step 302, binary zeros are written to bits 2 and 0 of POS register 4. The combined effect of steps 300 and 302 is to set the Enable bit and the Decode bit of the Bridge Enable register to enable the bridge 17 and to enable subtractive decoding. As indicated above, the Placement bit will be set by system logic.

In step 304, 11h is written to POS register 6. In step 306, a five-bit encoded value for identifying a PCI device on the daughter card 20 to be selected during a configuration operation is written to POS register 4. The combined effect of steps 304 and 306 is to write a five-bit encoded value to the PCI Device ID register. Referring again to FIG. 2, the five bit value written to the PCI Device ID register is input to and decoded by the decoder 216, driving one of the 24 output lines O(23-0) of the decoder 216 high. The 24 output bits on lines O(2-3-0) are stored in bits 31-8 of the buffer 218, respectively. As will be described, the value stored in bits 31-8 of the buffer 218 is used by the PCI interface 200 to activate one of the PCI AD(31-8) lines, which active line is used in connection with the CDSETUP/IDSEL signal to select a PCI device on the PCI bus 218 to be configured. For example, if the five bit encoded value is 01011b, the decoder 216 output line O(19) would be driven active and the PCI device attached to line AD(19) would be selected for configuration. Since the CDSETUP signal from the system bus 12 could only be passed through to one device on the PCI Interface 200, this solution allows from multiple selects during initial card set up.

In step 308, 12h is written to POS register 6. In step 310, a value between 00h and FFh corresponding to a byte of the 256-byte configuration address space is written to POS register 4. The combined effect of steps 308 and 310 is to write the PCI Configuration Address register the address of the PCI configuration data byte to be accessed. Bits 7-0 of this register are written to to bits 7-0, respectively, of the buffer 218. The PCI interface 200 uses bits 7-0 to drive PCI AD(7-0) lines, respectively, to address one of the PCI configuration data bytes (see FIG. 2a) during a PCI configuration operation.

In step 312, 13h is written to POS register 6. In step 314, the PCI configuration data byte selected in steps 308, 310 of the PCI device selected in steps 304, 306 may be read from/written to via POS register 4. In step 316, a determination any PCI configuration byte of the device selected in steps 304, 306 remain to be accessed. If so, execution returns to step 308, and steps 308-314 are repeated to select and read from/write to another byte of PCI configuration data of the same PCI device. If in step 31 6 it is determined that no configuration data remains to be accessed and initialized, execution proceeds to step 318, in which a determination is made whether another PCI operation with respect to another PCI device on the bus 18 is desired. If so, execution returns to step 304, and steps 304-314 are repeated to select another PCI device and initialize the configuration memory space thereof. Otherwise, execution ends in step 320.

Figure 4:
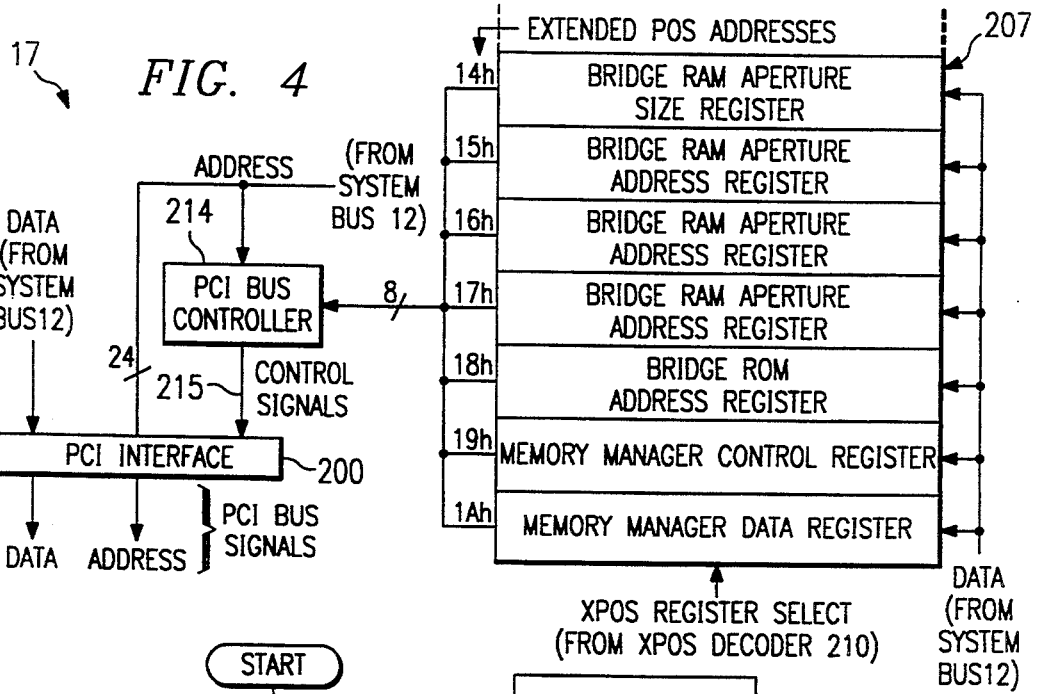
FIG. 4 is a detailed schematic block diagram of a portion of the bridge of FIG. 2 for implementing the memory space allocation protection of the present invention.

FIG. 4 illustrates a portion of the bridge 17 of FIG. 1 for ensuring that memory space is allocated to the daughter card 20 and is not subsequently overwritten by a memory manager (not shown) of the PC 8. As shown in FIG. 4, the PCI Memory Access Control registers, i.e., XPOS registers 14h-1Ah, are connected to the PCI bus controller 214 via a line 300. As will be described, the PCI bus controller 214 performs certain decoding and comparison operations, as will be described, and provides control signals to the PCI interface 200 for controlling the operation thereof. The configuration and function of the PCI Memory Access Control registers will now be described in detail.

XPOS register 14h is designated as a Bridge RAM Aperture Size register, which is used to set the limitations for a system bus 12 to daughter card 20 memory access. The state of bit 0 determines whether the RAM aperture is disabled (bit 0=0) or enabled (bit 0=1), depending on whether the daughter card 20 is present on the adapter card 14 and if so, whether the daughter card 20 includes RAM. When the RAM aperture is enabled (bit 0=1), bits 4-1 are used to store, in binary form, a decimal value X for indicating an amount of memory that the daughter card 20 has available, wherein the amount of available memory, in kilobytes, is equal to $2^{(X+2)}$. For example, if bits 4-1 are 1010b (X=10), the amount of available memory would be equal to $2^{10+2}$ KB, or 4,096 KB.

XPOS registers 15h, 16h and 17h are designated as the Bridge RAM Aperture Address register, which contains a 24-bit address comprising the starting address of the daughter card 20 memory based on an 8 KB boundary. During MCA memory cycle decodes, the PCI bus controller 214 will use the values stored in the Bridge RAM Aperture Size register and the Bridge RAM Aperture Address register to determine whether the on-board RAM (not shown) of the daughter card 20 is being accessed. A value stored in XPOS register 15h comprises the most significant byte (MSB) and a value stored in XPOS register 17h comprises the least significant byte (LSB) of the Bridge RAM Aperture Address register. Because the starting location of the daughter card RAM aperture is based on an 8 KB boundary, bits 4–0 of the Bridge RAM Aperture Address register, i.e., bits 4–0 of XPOS register 17h, are "don't cares," as the states of these bits are not used in making the comparison.

XPOS register 18h is designated as a Bridge ROM Aperture Address register, which is used to indicate the location of any ROM space of the daughter card 20. The daughter card is allowed only 2 KB of ROM area, and an encoded value stored in bits 7–1 of this register designates the location of this 2 KB area. Bit 0 is used to disable (bit 0=0) or enable (bit 0=1) the ROM aperture, depending on whether the daughter card includes ROM. The value stored in the Bridge ROM Aperture address register is encoded as shown in Table III below:

TABLE

| ENCODED VALUE | ROM APERTURE |
|---|---|
| 00h | 000C0000h–000C07FFh |
| 01h | 000C0800h–000C0FFFh |
| 02h | 000C1000h–000C17FFh |
| . | . |
| . | . |
| . | . |
| 3Dh | 000DE800h–000DEFFFh |
| 3Eh | 000DF000h–000DF7FFh |
| 3Fh | 000DF800h–000DFFFFh |

The value stored in the Bridge RAM Aperture Size register, as decoded by the PCI bus controller 214, along with the value stored in the Bridge RAM Aperture Address register (XPOS registers 15h–17h) are used to control MCA slave operation selections of the daughter card 20. For example, if the bridge RAM aperture is enabled (Bridge RAM Aperture Size register bit 0=1), an address on the 19 most significant address lines on the system bus 16 (due to the 8 KB boundary) will be decoded by the PCI bus controller 214 of the bridge 17. If the decoded address starts at or beyond the value contained in the Bridge RAM Aperture Address register and does not exceed the range specified by the Bridge RAM Aperture Size register, PCI controller 214 will initiate a PCI operation to the daughter card 20 via the bus 18.

Similarly, if the bridge ROM aperture is enabled (Bridge ROM Address Register bit 0=1) and the decoded address falls within the range indicated by the value contained in the Bridge ROM Address register, as decoded by the PCI bus controller 214, the controller 214 will to initiate a PCI operation to the daughter card 20 via the bus 18.

Several general observations with regard to the above discussion should be made at this point. First, it should be understood that the daughter card 20 must contain a byte of data in its PCI configuration space for indicating the amount of its on-board RAM. Alternatively, the daughter card 20 must be able to operate with an aperture the size of which is smaller than its on-board RAM. Further, if the daughter card 20 has more than 2 KB of on-board ROM, it must be able to operate within the confinements of a 2 KB aperture. It should be understood that the manner in which the daughter card 20 handles the above requirements with respect to the RAM and ROM apertures is device-specific and is does not form a part of this invention.

Additionally, if the daughter card 20 has on-board ROM, it must be able to operate in situations in which the RAM and ROM apertures overlap. For example, in the case where the daughter card 20 RAM aperture is the 8 KB in the C0000h–D0000h region, the RAM and ROM apertures will have the same starting address. Hence, the daughter card 20 must provide some means for toggling between the RAM and ROM so that the aperture may be shared. Alternatively, the daughter card 20 must have the ability to disable the first 2 KB of the RAM aperture, in which case the daughter card 20 must be able to detect that its RAM aperture is 6 KB, rather than 8 KB, and to operate with a 6 KB RAM aperture. Again, the method in which this is handled is device specific and as such, does not form a part of this invention.

It is known that devices, such as the daughter card 20, to be allocated a RAM and/or a ROM aperture in the C0000h–D00000h address region, must respond with the correct ROM signature when polled at DOS boot-up of the PC 10 so that the memory manager of the host 10 does not reallocate memory apertures allocated to the daughter card 20. Accordingly, at DOS boot-up, aperture offset 00h must contain a value of 55h, offset 01h must contain a value of AAh and offset 02h must contain a value of 04h or 10h for a 2 KB or 8 KB aperture, respectively This requirement is dealt with by the adapter card 14 by its having the bridge 17 respond to these offsets based on data contained in a Memory Manager Control register, which is XPOS register 19h, and a Memory Manager Data register, which is XPOS register 1Ah.

Bits 1–0 of the Memory Manager Control register are used to set the data flow mode of the bridge 17. Bits 7–2 are not used. When the bridge 17 is set to passthru mode (bits 1–0=00b), an address from the system bus 12 is passed through the bridge 17 to the PCI interface 200 and onto the PCI bus 18. When the data flow mode is set to RAM (bits 1–0=01b) or ROM (bits 1–0=10b), the bridge 17 provides the data for the ROM signature (offsets 00h, 01h and 02h). Offsets 00h and 01h are hard coded to 55h and AAh, respectively. The data for offset 02h is provided by Memory Manager Data register, which will contain 04h or 10h, depending on whether a 2 KB or 8 KB aperture has been allocated to the daughter card 20, respectively.

Figure 5:
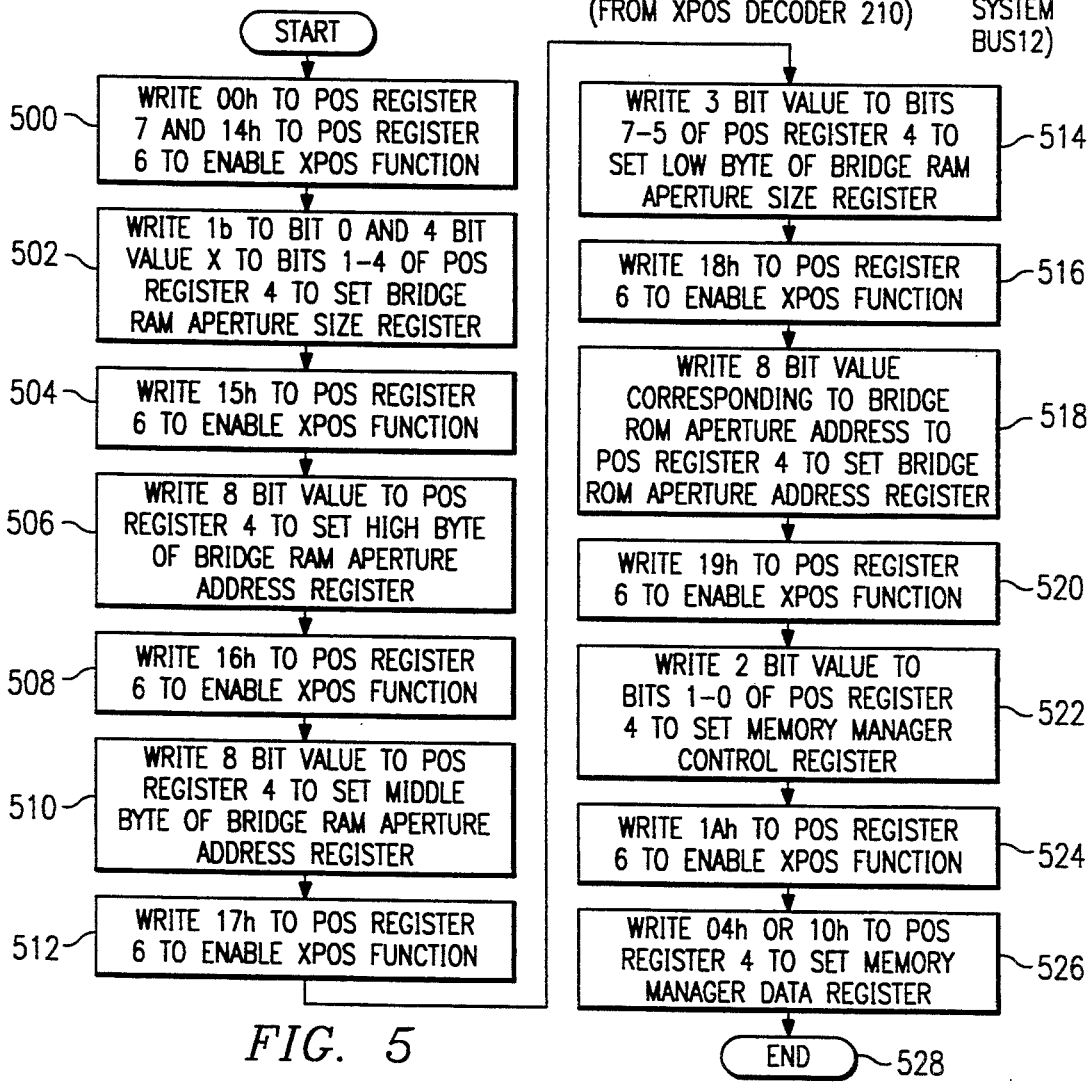
FIG. 5 is a flowchart of a method of the present invention for ensuring that an appropriate amount of memory space is allocated to the PCI extension card and is not subsequently overwritten.

FIG. 5 is a block diagram of a method of setting the appropriate registers to ensure that memory space is allocated to the daughter card 20 and not subsequently overwritten. In step 500, 00h is written to POS register 7 and 14h is written to POS register 6. In step 502, a binary 1 is written to bit 0 of POS register 4 and a four bit binary value corresponding to a decimal value X is written to bits 1–4 of POS register 4. The collective effect of steps 500 and 502 is to write to the Bridge RAM Aperture Size register to enable a the bridge RAM aperture and to indicate the amount of memory that the daughter card 20 has available, as described above.

In step 504, 15h is written to POS register 6. In step 506, an 8-bit value comprising the MSB of the Bridge RAM Aperture Address register is written to POS register 4. In step 508, 16h is written to POS register R6. In step 510, an 8-bit value comprising the second MSB of the Bridge RAM Aperture Address register is written to POS register 4. In step 512, 17*h* is written to POS register 6. In step 514, a 3-bit value representing the three least significant bits of the Bridge RAM Aperture Address register is written to bits 7-5 of POS register 4. The collective effect of steps 504-514 is to write the starting address of the RAM aperture of the daughter card 20, based on an 8 KB boundary, to the 24-bit Bridge RAM Aperture Address register comprising XPOS registers 15*h*-17*h*.

It should be noted that bits 4-0 of XPOS register 17*h*, and similarly bits 4-0 of the Bridge RAM Aperture Address register, are don't cares. This is due to the fact that, as indicated above, during an MCA memory cycle decode, the five bit value contained in the Bridge RAM Aperture Size register is used by the PCI bus controller 214 to determine the amount of RAM the daughter card 20 has available, as described above. In addition, the upper 19 bits of the MCA address are input to the PCI bus controller 214 and compared with the bridge RAM aperture address, stored in bits 24-5 of the Bridge RAM Aperture Address register, which address is also input to the controller 214, to determine whether daughter card 20 RAM has been accessed. If so, the PCI bus controller 214 causes the MCA address to be passed to the PCI bus 18 via the PCI interface 200.

In step 516, 18*h* is written to POS register 6. In step 518, a 1 is written to bit 0 and a 6-bit value representing the location of the 2 KB bridge ROM aperture is written to bits 6-2 of POS register 4. The combined effect of steps 516 and 518 is to enable the bridge aperture by setting bit 0 of the Bridge Aperture Size register (XPOS register X18*h*) to 1 and to set the store the location of the daughter card 20 ROM aperture in bits 6-1 of the Bridge Aperture Address register to a value representative of the location of the 2 KB bridge aperture, as described above.

In step 520, 19*h* is written to POS register 6. In step 522, a 2-bit value is written to bits 1-0 of POS register 4. The collective effect of steps 520, 522 is to initialize the Memory Manager Control register to set the data flow mode of the bridge 17, as previously described. In step 524, 1A*h* is written to POS register 6. In step 526, 04*h* or 10*h* is written to POS register 4, for a 2 KB or an 8 KB aperture, respectively. The combined effect of steps 524 and 526 is to initialize the Memory Manager Data register so that it may be used as offset 02*h* of the ROM signature. Execution ends in step 528.

It is understood that the present invention can take many forms and embodiments. The embodiments shown herein are intended to illustrate rather than to limit the invention, it being appreciated that variations may be made without departing from the spirit or the scope of the invention. For example, more than one PCI daughter card may reside on the PCI bus 18 of the adapter card 14 and controlled by control signals from the PCI bus controller 214 of the bridge 17. Furthermore, it will be appreciated that different elements may be embodied as a single integrated chip, or any varying combination of discrete digital or analog components interconnected in a standard manner.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method of configuring and ensuring that system memory space is allocated to at least one daughter card residing on a first type of bus on an adapter card, said adapter card being connected to a host portion of a computer via a second type of bus and comprising a bridge for interfacing said first type of bus with said second type of bus, the method comprising:
    storing a value which identifies a device residing on said at least one daughter card in a first register of said adapter card;
    storing a value which addresses a byte of configuration data of said identified device in a second register of said adapter card;
    writing configuration data to be written to said addressed configuration data byte of said identified device to a third register of said adapter card;
    responsive to said at least one daughter card including RAM, selectively enabling a RAM aperture for addressing said RAM;
    responsive to said at least one daughter card including ROM, selectively enabling a ROM aperture for addressing said ROM;
    storing a size of said RAM aperture in a fourth register of said adapter card;
    storing a starting address of said RAM aperture in a fifth register of said adapter card;
    storing a location of said ROM aperture in a sixth register of said adapter card;
    wherein each of said adapter card registers are electrically coupled to said bridge.

2. The method of claim 1 further comprising:
    enabling said bridge to perform operations necessary to interface said first type of bus with said second type of bus.

3. The method of claim 2 wherein said enabling said bridge further comprises:
    setting a first bit of a seventh register of said adapter card.

4. The method of claim 1 further comprising:
    setting a data flow mode of said bridge;
    storing in a eighth register of said adapter card a value to be used as an offset 02*h* of a ROM signature of said at least one daughter card, wherein said fourth register is electrically coupled to said bridge.

5. The method of claim 4 further comprising:
    hardwiring an offset 00*h* of said ROM signature to 55h; and
    hardwiring an offset 01*h* of said ROM signature to AAh.

6. The method of claim 4 further comprising:
    responsive to said bridge data flow mode being set to a first mode, said bridge passing addresses received from said second type of bus to said daughter card via said first type of bus; and
    responsive to said bridge data flow mode being set to a second mode, said bridge providing said ROM signature to said host portion during DOS boot-up of said computer.

7. The method of claim 4 wherein said setting said bridge data flow mode comprises setting at least one bit of a ninth register of said adapter card, wherein said ninth register is electrically coupled to said bridge and comprises an extended programmable option select (XPOS) register of said adapter card.

8. The method of claim 1 wherein said first type of bus comprises a Peripheral Component Interface (PCI) bus and said second type of bus comprises a Micro Channel Architecture (MCA) bus.

9. The method of claim 1 wherein each of said adapter card registers comprise extended programmable option select (XPOS) registers of said adapter card.

10. The method of claim 1 wherein said first bus comprises thirty-two address lines, said thirty-two address lines comprising twenty-four most significant address lines and eight least significant address lines and wherein said identified device is connected to one of said twenty-four most significant address lines, the method further comprising:
using a decoder to decode said value stored in said first register;
outputting said decoded value on said twenty-four most significant address lines of said first type of bus, said decoded value activating said one of said twenty-four most significant address lines; and
outputting said value stored in said second register on said eight least significant address lines of said first type of bus.

11. The method of claim 1 further comprising:
said bridge interfacing a CDSETUP line of said MCA bus with an IDSEL line of said PCI bus.

12. The method of claim 1 wherein said first type of bus comprises at least eight data lines and wherein said writing configuration data further comprises:
outputting said configuration data on said at least eight data lines.

13. The method of claim 1 wherein said selectively enabling said RAM aperture comprises setting at least one bit of said first register.

14. The method of claim 1 wherein said selectively enabling said ROM aperture comprises setting at least one bit of said third register.

15. The apparatus of claim 1 wherein said fourth register means further comprises means for selectively enabling said RAM aperture.

16. The apparatus of claim 1 wherein said sixth register means further comprises means for selectively enabling said ROM aperture.

17. A method of ensuring that system memory space is allocated to at least one daughter card residing on a first type of bus on an adapter card, said adapter card being connected to a host portion of a computer via a second type of bus and comprising a bridge for interfacing said first type of bus with said second type of bus, the method comprising: responsive to said at least one daughter card including RAM, selectively enabling a RAM aperture for addressing said RAM;
responsive to said at least one daughter card including ROM, selectively enabling a ROM aperture for addressing said ROM;
storing a size of said RAM aperture in a first register of said adapter card;
storing a starting address of said RAM aperture in a second register of said adapter card;
storing a location of said ROM aperture in a third register of said adapter card;
wherein said first, second and third registers are electrically coupled to said bridge.

18. The method of claim 17 further comprising:
setting a data flow mode of said bridge;
storing in a fourth register of said adapter card a value to be used as an offset $02h$ of a ROM signature of said at least one daughter card, wherein said fourth register is electrically coupled to said bridge.

19. The method of claim 18 further comprising:
hardwiring an offset $00h$ of said ROM signature to 55h; and
hardwiring an offset $01h$ of said ROM signature to AAh.

20. The method of claim 18 wherein said storing in said fourth register further comprises:
responsive to said at least one daughter card having an 8 kilobyte memory aperture, storing $10h$ in said fourth register; and
responsive to said daughter card not having an 8 kilobyte memory aperture and having a 2 kilobyte memory aperture, storing $04h$ in said fourth register.

21. The method of claim 18 wherein said first, second and third registers comprise extended programmable option select (XPOS) registers of said adapter card.

22. The method of claim 18 further comprising:
responsive to said bridge data flow mode being set to a first mode, said bridge passing addresses received from said second type of bus to said daughter card via said first type of bus; and
responsive to said bridge data flow mode being set to a second mode, said bridge providing said ROM signature to said host portion during DOS boot-up of said computer.

23. The method of claim 18 wherein said setting said bridge data flow mode comprises setting at least one bit of a fifth register of said adapter card, wherein said fifth register is electrically coupled to said bridge and comprises an extended programmable option select (XPOS) register of said adapter card.

24. The method of claim 18 wherein said first type of bus is a Peripheral Component Interface (PCI) bus and said second type of bus is a Micro Channel Architecture (MCA) bus.

25. The method of claim 18 wherein said selectively enabling said RAM aperture comprises setting at least one bit of said first register.

26. The method of claim 18 wherein said selectively enabling said ROM aperture comprises setting at least one bit of said third register.

27. A method of configuring a daughter card residing on a Peripheral Component Architecture (PCI) bus on an adapter card connected to a host portion of a computer via a Micro Channel Architecture (MCA) bus and comprising a bridge for interfacing said PCI bus with said MCA bus, the method comprising:
storing in a first register of said adapter card a value which identifies one of a plurality of PCI-compliant devices residing on said at least one daughter card;
storing in a second register of said adapter card a value which addresses a byte of configuration data of said identified one of said PCI-compliant devices; and
writing configuration data to said addressed configuration data byte of said identified one of said PCI-compliant devices to a third register of said adapter card by writing said configuration data to a third register of said adapter card.

28. The method of claim 27 wherein said first bus comprises thirty-two address lines, said thirty-two address lines comprising twenty-four most significant address lines and eight least significant address lines and wherein said identified one of said plurality of PCI-compliant devices is connected to one of said twenty-four most significant address lines, the method further comprising:
- using a decoder to decode said value stored in said first register;
- outputting said decoded value on said twenty-four most significant address lines of said first type of bus, said decoded value activating said one of said twenty-four most significant address lines; and
- outputting said value stored in said second register on said eight least significant address lines of said first type of bus.

29. The method of claim 28 wherein said first, second, third and fourth registers comprise extended programmable option select (XPOS) registers of said adapter card and are electrically coupled to said bridge.

30. The method of claim 28 further comprising:
reading a read only bit of said fourth register to determine whether said bridge resides on said adapter card or on a planar of a computer.

31. The method of claim 28 further comprising:
- responsive to said bridge supporting subtractive address decoding, setting a second bit of said fourth register to a first state; and
- responsive to said bridge supporting subtractive/positive address decoding, setting said second bit of said fourth register to a second state.

32. The method of claim 27 further comprising:
enabling said bridge to perform operations necessary to interface said first type of bus with said second type of bus.

33. The method of claim 27 wherein said selectively enabling said bridge further comprises:
setting a first bit of a fourth register of said adapter card.

34. The method of claim 27 further comprising:
said bridge interfacing a CDSETUP line of said MCA bus with an IDSEL line of said PCI bus.

35. The method of claim 27 wherein said first type of bus comprises at least eight data lines and wherein said writing configuration data further comprises:
outputting said configuration data on said at least eight data lines.

36. Apparatus for configuring and ensuring that system memory space is allocated to at least one daughter card residing on a Peripheral Component Interface (PCI) bus on an adapter card, said adapter card being connected to a host portion of a computer via a Micro Channel Architecture (MCA) bus and comprising a bridge for interfacing said PCI bus with said MCA bus, the apparatus comprising:
- first register means electrically coupled to said bridge for storing a value which identifies a device residing on said at least one daughter card;
- second register means electrically coupled to said bridge for storing a value which addresses to a byte of configuration data of said identified device;
- means for writing configuration data to be written to said addressed configuration data byte of said identified device to a third register means electrically coupled to said bridge;
- fourth register means electrically coupled to said bridge for storing a size of a RAM aperture of said at least one daughter card;
- fifth register means electrically coupled to said bridge for storing a starting address of said RAM aperture; and
- sixth register means electrically coupled to said bridge for storing a location of a ROM aperture of said at least one daughter card.

37. The apparatus of claim 36 further comprising:
- means for setting a data flow mode of said bridge;
- eighth register means electrically coupled to said bridge and comprising an XPOS register of said adapter card for storing a value to be used as an offset 02h of a ROM signature of said at least one daughter card.

38. The apparatus of claim 37 wherein said means for setting said bridge data flow mode comprises at least one bit of a ninth register means electrically coupled to said bridge and comprising an XPOS register of said adapter card.

39. The apparatus of claim 36 further comprising:
means for selectively enabling said bridge.

40. The apparatus of claim 39 wherein said means for selectively enabling said bridge comprises a first bit of a seventh register means electrically coupled to said bridge, wherein said bridge is enabled when said first bit is set to a first binary state and disabled when said first bit is set to a second binary state.

41. The apparatus of claim 36 wherein each of said register means comprises an extended programmable option select register of said adapter card.

42. The apparatus of claim 36 wherein said MCA bus comprises thirty-two address lines and wherein said identified device is connected to one of the twenty-four most significant of said thirty-two address lines, the apparatus further comprising:
- decoder means connected to said first register means for decoding said value stored in said first register;
- a thirty-two bit buffer means connected to receive said decoded value and store same in the twenty-four most significant bit positions of said buffer means and connected to receive said value stored in said second register means and store same in the eight least significant bits of said buffer means; and
- interface means connected between said buffer means and said PCI bus for outputting said the contents of said buffer on thirty-two address lines of said PCI bus.

43. The apparatus of claim 36 further comprising:
means for interfacing a CDSETUP line of said MCA bus with an IDSEL line of said PCI bus.

44. The apparatus of claim 36 further comprising;
means for interfacing said third register means with said PCI bus such that said configuration data is output on data lines of said PCI bus.

* * * * *